US008862945B2

(12) United States Patent
Verbest

(10) Patent No.: US 8,862,945 B2
(45) Date of Patent: Oct. 14, 2014

(54) SYSTEM AND METHOD FOR MEASURING THE EFFECT OF INTERRUPTIONS ON SOFTWARE APPLICATION USABILITY

(75) Inventor: Guy Verbest, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 13/269,749

(22) Filed: Oct. 10, 2011

(65) Prior Publication Data

US 2013/0091384 A1 Apr. 11, 2013

(51) Int. Cl.
G06F 11/00 (2006.01)
G06F 11/34 (2006.01)
G06F 11/36 (2006.01)

(52) U.S. Cl.
CPC ...... G06F 11/3438 (2013.01); G06F 2201/865 (2013.01); G06F 11/3684 (2013.01); G06F 11/3688 (2013.01)
USPC ............................................. 714/46; 702/182

(58) Field of Classification Search
USPC .................. 714/1, 46; 702/182; 715/700, 751
See application file for complete search history.

(56) References Cited

U.S. PATENT DOCUMENTS 6,118,447 A * 9/2000 Harel ............................ 717/131
7,613,589 B2 * 11/2009 Hosagrahara ................. 702/182
7,636,892 B2 * 12/2009 Elie .............................. 715/751
7,673,287 B2 * 3/2010 Mayer-Ullmann et al. ... 717/124
2007/0209010 A1 * 9/2007 West ............................. 715/762
2008/0133816 A1 * 6/2008 Hurling ......................... 711/100

OTHER PUBLICATIONS

McFarlane, Daniel C.; "Comparison of Four Primary Methods for Coordinating the Interruption of People in Human-Computer Interaction;" Published in Human-Computer Interaction Journal: vol. 17, Issue 1, Mar. 2002; pp. 63-139.*
Teague, Ross, De Jesus, Katherine, and Marcos Nunes-Ueno; "Concurrent Vs. Post-Task Usability Test Ratings;" in Proceedings of CHI 2001 Extended Abstracts on Human Factors in Computing, Short Talks; 2001; pp. 289-290.*
Adamczyk, Piotr D., et al., A Method, System, and Tools for Intelligent Interruption Management, TAMODIA 2005, Sep. 26-27, 2005, Gdansk, Poland, pp. 123-126, English language.
Adamczyk, Piotr D., et al., If Not Now, When?: The Effects of Interruption at Different Moments Within Task Execution, CHI 2004, Apr. 24-29, 2004, Vienna, Austria, pp. 271-278, English language.
Altmann, Erik M., et al., Timecourse of recovery from task interruption: Data and a model, Psychonomic Society, Inc., 2007, pp. 1079-1084, English language.
Bailey, Brian P., et al., A framework for specifying and monitoring user tasks, Elsevier, Ltd., 2005, published Feb. 2006, pp. 709-732, English language.
Dawe, Emilie, et al., The Effect of Interruptions on Knowledge Work, 7th World Congress on the Management of eBusiness, Jul. 2006, Dalhouse University, pp. 1-15, English language.

* cited by examiner

Primary Examiner — Scott Baderman
Assistant Examiner — Joseph Kudirka

(57) ABSTRACT

An exemplary embodiment of the present techniques may request a user to execute a task using a software application under test. An interruption may be generated that interrupts the user while the user is attempting to complete the task, and measuring an effect of the interruption on the ability of the user to successfully complete the task.

19 Claims, 4 Drawing Sheets

100

300

SYSTEM AND METHOD FOR MEASURING THE EFFECT OF INTERRUPTIONS ON SOFTWARE APPLICATION USABILITY

BACKGROUND

Measuring the usability of a software application can be a valuable part of software design, development, and testing. The usability of a software application may be defined as the ease with which users interact with the software. The usability of a software application may be determined by measuring the user's experience with the software application as the user interacts with the software application. The ease of use of a software application can be a valuable differentiator among software applications, and accurately measuring the ease of use may provide a competitive advantage to a software application that incorporates the results of these measurements.

Usability may be measured during a usability test. Generally, a usability test is a plan or script, during which one or more users complete several planned or scripted tasks using the software application under test. During the usability test, the user may be placed in an environment that is far from the typical environment in which the user may actually execute the software. Accordingly, various fine details of the user's environment may be ignored during usability testing. As a result, the measured usability may not give a true measure of the software application's usability.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

When a software application is used, various real world influences may occur that interrupt or distract a user's interaction with the software application. Environmental factors and real world influences are often omitted or ignored when usability testing is conducted, as standard usability testing is often executed under conditions that inadequately represent real user environments. For example, the user may be located in a quiet room and asked to perform a series of tasks in sequential fashion, without any interruptions. These tasks are often scripted. Consequently, the usability tests conducted in such an "artificial" environment may not accurately measure the user's experience as the user interacts with the software application, and may fail to detect or identify actual user-related problems and potential software defects.

Embodiments of the present techniques provide a system and method for measuring the effect of interruptions on software application usability by simulating an operating environment for a user, and generating interruptions while the user is interacting with the software application. Both real world influences and environmental factors can be incorporated to measure a software application's usability. As used herein, the terms "software" or "application" may refer to any collection of computer executable instructions that may perform one or more tasks on a computer. The one or more tasks may be initiated by a user of the software application. Further, interruptions and distractions are interchangeable terms that refer to an event or situation that gains the attention of a user during usability testing.

Figure 1:
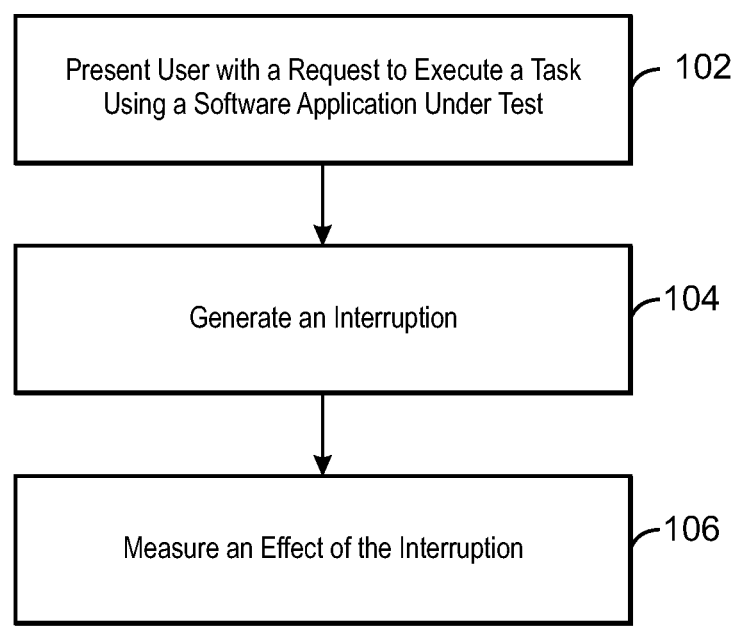
FIG. 1 is a process flow diagram of an overview of a method for measuring the effect of interruptions on software application usability according to an embodiment of the present techniques.

FIG. 1 is a process flow diagram of an overview of a method 100 for measuring the effect of interruptions on software application usability according to an embodiment of the present techniques. At block 102, a user may be presented with a request to execute a task using the software application undergoing the usability test. The request may be presented by the usability test using a pre-determined script or usability test plan.

At block 104, an interruption may be generated that interrupts the user while the user is attempting to complete the task. When the interruption generated is closely aligned with an interruption that may occur in the user's actual environment, the true usability of the software application may be measured. Interruptions can mimic any unavoidable situation a user of the software application may encounter while interacting with the software application, and may include those interruptions that occur in the context of use for the software application. For example, a word processing software application may be used in work environments. In a work environment, interruptions may include phone calls, email pop-ups, instant messages, and questions from colleagues. The location of the interruption within the usability test as well as the duration of the interruption can be selected in order to test specific portions of the software application. Alternatively, the location of the interruption within the usability test can be generated randomly.

At block 106, an effect of the interruption on the software application's usability may be measured. The ability of the user to successfully complete the task may be an indicator of the software application usability. Additionally, the effect of the interruption may be measured using metrics such as recovery time and user error.

The recovery time may be defined as the time it takes for a user to return to the point within an in-progress task where the user left off after an interruption occurs. In other words, the recovery time is the amount of time it takes the user to return to the task at hand after being interrupted or distracted. The recovery time following an interruption can vary significantly depending on various factors, including the type of interruption, the duration of the interruption, the task that the user was performing when the interruption occurred. While the user is off-task, the productivity of the user with regard to the software application is lost. Accordingly, the recovery time may also be considered a productivity metric. Depending on the difficulty of the task, the type of interruption, and the duration of the interruption, recovery time as a productivity metric may be used to answer productivity questions as a part of the usability test.

User error may be defined as any action or behavior that is not correct or appropriate. The user error can be an error that is found by comparing the user's actions to the responses expected by the usability test, or the user error can be an action or behavior that is completely incorrect. Further, the user error can be an action or behavior that is unexpected. Typically, user errors occur more frequently following an interruption. The user error may include instances where the user cannot recall what task was being done prior to the interruption, including moving onto a new task without completing the previous task. User error may also occur when a user inadvertently duplicates a task. These errors may not have occurred if the user was not interrupted. As user actions that result in errors increase due to interruptions, it is more likely that data input by the user, which is used by the software application undergoing the usability test, may be incorrect, and therefore may result in a lower quality of output from the software application. Accordingly, when the number of user errors increase while interacting with the software application, the quality of the output from the software application may decrease. Given this inverse relationship between the number and types of errors committed and the overall quality, the measurement of user errors can be considered a quality metric.

Measuring both the productivity and quality metrics can enable product development teams to determine if the user interface should be modified, enhanced, or clarified to enable the user to more efficiently and effectively return to what the user was doing following an interruption. Recovery time can be controlled, and in some cases may be minimized through efficient software design. Additionally, user errors can also be controlled and minimized through software design. Product developers may use the metrics provided by the usability test results to refine the software application and improve the usability of the software application.

Figure 2:
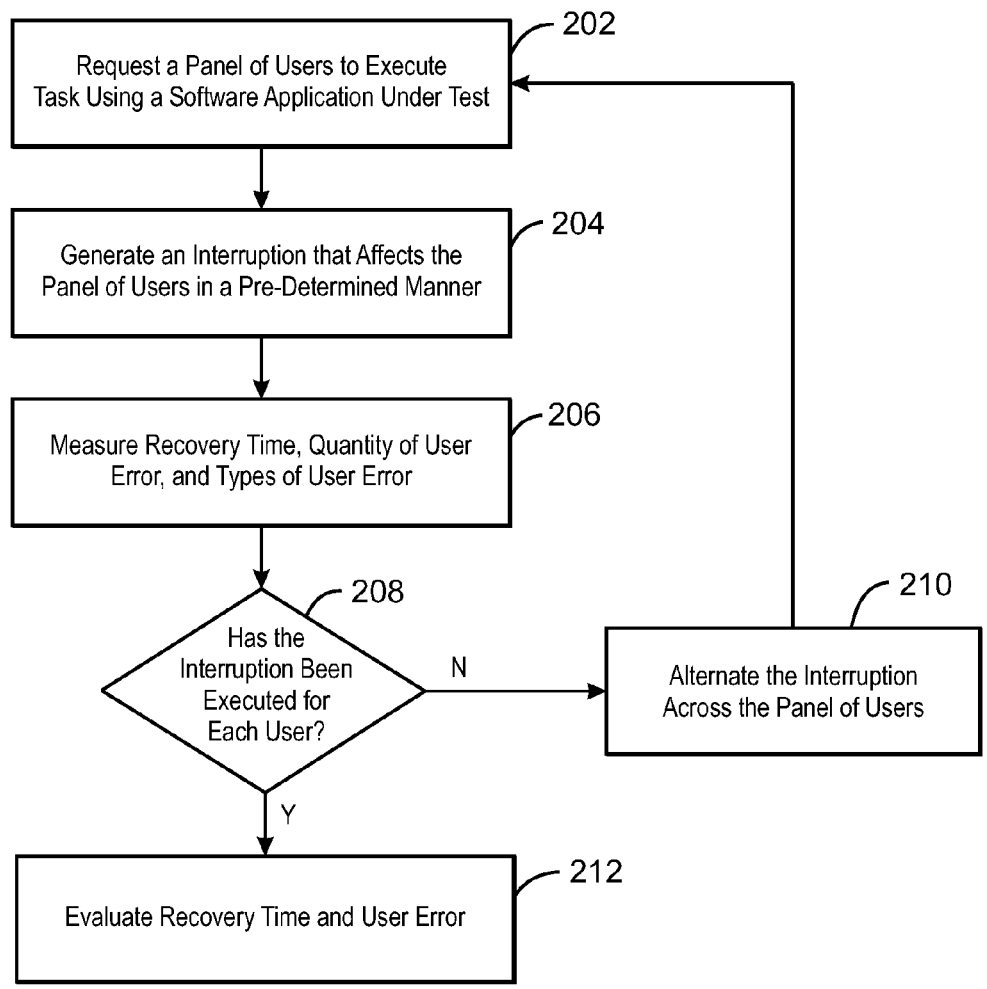
FIG. 2 is a process flow diagram of a method for measuring the effect of interruptions on software application usability according to an embodiment of the present techniques.

FIG. 2 is a process flow diagram of a method 200 for measuring the effect of interruptions on software application usability according to an embodiment of the present techniques. At block 202, a panel of users may be requested to execute a task using a software application undergoing the usability test. At block 204, an interruption may be generated that affects the panel of users in a pre-determined manner. The interruption affect the panel of users in a pre-determined many by causing the users to shift focus for a few seconds, or the interruption can cause the users to completely leave the software application being tested. The types of interruptions generated may depend on the software application or the particular usability test. An interruption that affects the panel of users in a pre-determined manner may include a brief interruption, a moderate interruption, or a long interruption.

A brief interruption is a simple task in which the user turns their attention away from the software application, and can be likened to a short distraction. In a work environment, the brief interruption may be a relatively simple verbal question, such as a phone call or someone asking the user to find a sheet of paper in a file on a desk next to them. This type of question is intended to turn the user's attention away from the software application for only a few seconds.

A moderate interruption is a complex, multiple question interruption in which the user is requested to use the computer for some task that is outside of the software application on which the usability test is being performed and then respond to a follow-on question. In this manner, the user would be requested to navigate off of the software application under test for several seconds, like when an email or instant message is received that requires further action from the user. In a work environment, the user could be asked to provide the service pack version of the operating system currently running on the computer. In order to obtain this information, the user would be required to temporarily leave the software application screen and open additional windows on the computer system. After the initial response from the user, a follow-on question may be asked, such as if there is a certain directory present on the hard drive. This follow-on question again requires the user to open additional windows.

A long interruption is an interruption in which the user physically moves away from the computer system running the software application undergoing usability testing for an extended period of time in order to complete another, unrelated task. The extended period of time may be, for example, between five and ten minutes longer. In a long interruption related to the user's work environment, the user may be asked to stop what they are doing and walk with someone away from the computer system, such as going to get coffee or a soft drink. During this walk, a topic unrelated to the software application may be discussed. The user may be kept away from the software application for approximately ten minutes or longer, discussing any variety of topics unrelated to the application that is currently being tested.

The location of the interruption within the usability test and the duration of the interruption within the usability test may be specified by the usability test, or can be randomly generated by the usability test before the user executes a task using the software application under test. Additionally, the type of interruption and the location where the interruption is inserted into the usability test may depend on the software application undergoing the usability test. When the locations are specified, the locations may be deliberately selected in order to test particular aspects of the software application. The usability test may select locations based on information provided regarding the portions of the software application to be tested. For example, a software developer may want to test the user interface of a software application. The software developer may provide information on the user interface to the usability test, and the usability test can select locations for interruptions that tests different aspects of the user interface. In embodiments, existing usability tests may be reviewed in order to identify locations within the usability test to generate an interruption. Further, in embodiments, random locations may be identified to generate the interruption.

As noted above, specific locations to insert interruptions may depend on the context of the software application undergoing the usability test. For example, a usability testing task may request a user to open an 'Add new devices' screen and enter the information for three new computers. The desired interruption for this task may be inserted at a location in the task when the user is in the process of entering the information for a second computer. Similarly, consider a task where the user is asked to open a 'Create a Report' screen and select three criteria such as all people located in the New England region of the USA, all people working in a sales and marketing function, or all people who have not upgraded their computer in over two years. The desired interruption for this task might occur when the user has selected two of the three search criteria requested. The type and location of each interruption can be strategically selected in order to test a range of fine details within the software application.

At block 206, the recovery times, the quantity of user errors, and types of user errors committed during each task that was completed by each user may be measured. Specifically, measuring the effect of the interruptions on usability for each user may include measuring a recovery time and user errors, and observing user behavior. Additionally, any comments the user makes that might indicate confusion or other relevant mental states may be recorded by the usability test. In embodiments, the usability test may use a timer or clock to capture the duration of recovery times as well as various tasks performed by the user during the usability test. Accordingly, the timer or clock may capture the duration of the interruption, the duration of the effect of the interruption, or the duration of the task performed by the user.

At block 208, it is determined if the interruption has been executed for each user of the panel of users. For example, in a panel of six users, there may be one or more different interruptions within the usability test that occur when both the usability test and the software application are executed. Each of the one or more interruptions may be executed for each user of the panel of users.

If the interruption has not been executed for each user of the panel of users, process flow continues to block 210. If the interruption has been executed for each user of the panel of users, process flow continues to block 212.

At block 210, the interruption may be alternated across the panel of users. Alternating the interruption generated for each user of the panel of users may allow each user to be subjected to each interruption type at least once during the usability test. In this manner, the effect on the usability test results due to a specific user's abilities and behaviors may be reduced. Further, confidence in the usability test findings and results may be increased by reducing the human factor introduced by each user.

For example, for a first usability test task, it might be beneficial to structure the interruptions such that, among a panel six of users, User 1 and User 2 are subjected to a brief interruption. During the same first usability test task, User 3 and User 4 are subjected to a moderate interruption, and User 5 and User 6 are subjected to a long interruption. However, for the second usability test task, interruptions may be staggered across the panel of users such that User 5 and User 6 are subjected to the brief interruption, while User 1 and User 2 are subjected to the moderate interruption, and User 3 and User 4 are subjected to the long interruption.

In embodiments, the same usability test could be run on a small panel of different users without interruptions in order to compare the results with the usability test including interruptions. If there is little to no difference between the results of the usability test when it is conducted with various interruptions and the same test conducted without any interruptions, then the software application may be determined to be optimized in terms of usability at points when interruptions occur. Conversely, if there are significant differences between the usability test when it is conducted with various interruptions and the same test conducted without any interruptions, there may be specific areas in the software application that may be weak in terms of usability at points when interruptions occur. These areas may be interpreted as opportunities to address the software application design in order to improve the overall user experience.

At block 212, recovery time and user error may be evaluated. The usability test tasks that have longer than expected recovery times may be highlighted. Additionally, user errors that occurred during the usability test may be recorded in detail. Any other observations noted during the usability testing may also be compiled, such as user behavior and user comments. Instances where the user commits an error may be recorded, and software developers may analyze the recordings for input on enhancing the software application.

In embodiments, the results of the usability plan can be used to correct usability issues or enhance the software. Usability issues are aspects of the software that have a negative effect on the ability of the user to complete a task successfully and in a timely fashion. Usability issues may be found at locations of the usability test that measured long recovery times or high user errors in response to the interruptions. Further, a usability issue may be found based on user behavior, such as when the user performs an operation that causes an error, effects the integrity of the user's data, and the like. Product development teams may also provide additional data validation or error handling logic into the software application undergoing the usability test, in order to eliminate or minimize the cases where users could potentially encounter usability issues.

Including real work environment events such as interruptions and distractions in the assessment of a software application's usability provides a more complete and accurate evaluation of the true ease of use and intuitiveness of the software application. This enables a product development team to address potential issues before the product ships, deliver a quality product, and also potentially reduce warranty and support costs downstream. Further, this approach is inexpensive to implement. The user may also benefit from better overall productivity, shorter recovery times, and fewer user errors that come from working with a well designed product, resulting in higher customer satisfaction and loyalty.

Figure 3:
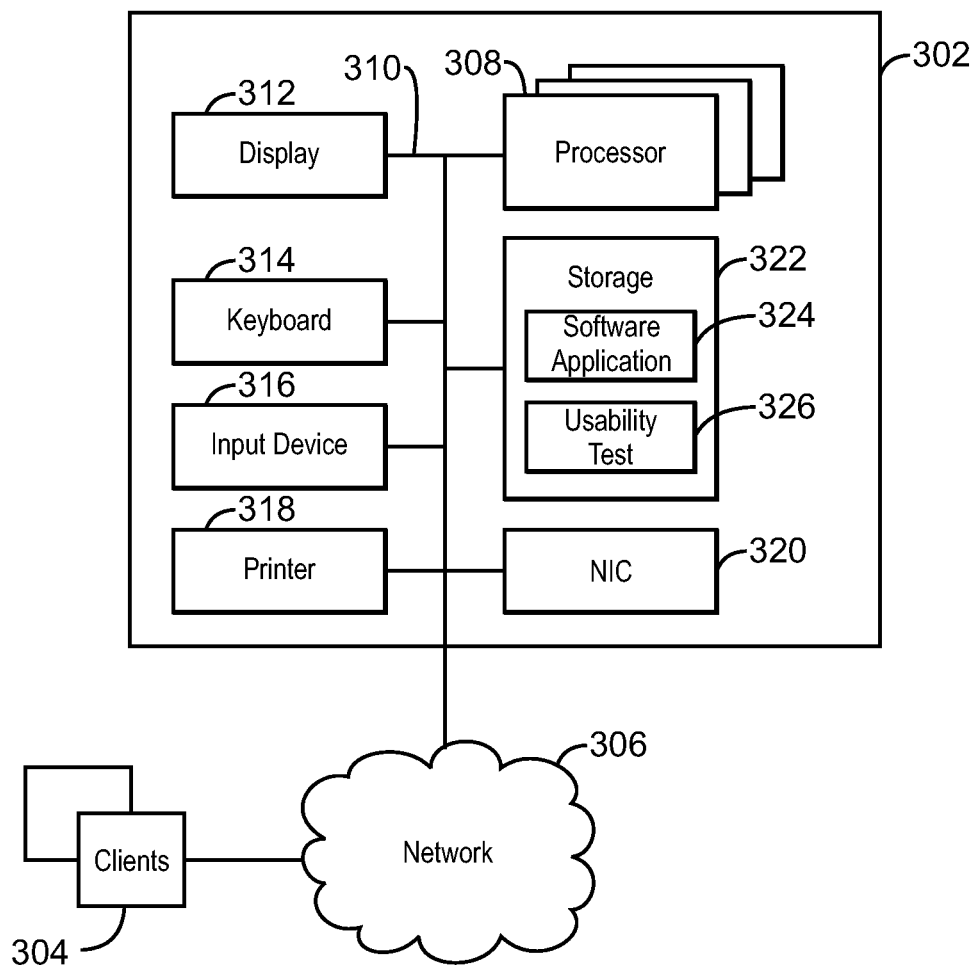
FIG. 3 is a block diagram of a system that measures the effect of interruptions on software application usability according to an embodiment of the present techniques.

FIG. 3 is a block diagram of a system that measures the effect of interruptions on software application usability according to an embodiment of the present techniques. The system is generally referred to by the reference number 300. Those of ordinary skill in the art will appreciate that the functional blocks and devices shown in FIG. 3 may comprise hardware elements including circuitry, software elements including computer code stored on a non-transitory, computer-readable medium, or a combination of both hardware and software elements. Additionally, the functional blocks and devices of the system 300 are but one example of functional blocks and devices that may be implemented in an embodiment. Those of ordinary skill in the art would readily be able to define specific functional blocks based on design considerations for a particular electronic device.

The system 300 may include a testing computer 302, and one or more client computers 304, in communication over a network 306. As illustrated in FIG. 3, the testing computer 302 may include one or more processors 308 which may be connected through a bus 310 to a display 312, a keyboard 314, one or more input devices 316, and an output device, such as a printer 318. The input devices 316 may include devices such as a mouse or touch screen. The user may use the display 312, keyboard 314, input devices 316, or printer 318 to perform tasks under the usability test.

The processors 308 may include a single core, multiple cores, or a cluster of cores in a cloud computing architecture. The testing computer 302 may also be connected through the bus 310 to a network interface card (NIC) 320. The NIC 320 may connect the testing computer 302 to the network 306.

The network 306 may be a local area network (LAN), a wide area network (WAN), or another network configuration. The network 306 may include routers, switches, modems, or any other kind of interface device used for interconnection. The network 306 may connect to several client computers 304. Through the network 306, several client computers 304 may connect to the testing computer 302. The client computers 304 may be similarly structured as the testing computer 302.

The testing computer 302 may have other units operatively coupled to the processor 308 through the bus 310. These units may include tangible, machine-readable storage media, such as storage 322. The storage 322 may include any combinations of hard drives, read-only memory (ROM), random access memory (RAM), RAM drives, flash drives, optical drives, cache memory, and the like. The storage 322 may include a software application 324 and a usability test 326 as used in embodiments of the present techniques. Although the software application 324 and the usability test 326 are shown to reside on testing computer 302, a person of ordinary skill in the art would appreciate that the software application 324 and the usability test 326 may reside on the testing computer 302 or any of the client computers 304. Thus, the software application 324 may be located on a client computer 304 and accessed through a network 306. Similarly, and the usability test 326 may be located on a client computer 304 and accessed through a network 306.

Figure 4:
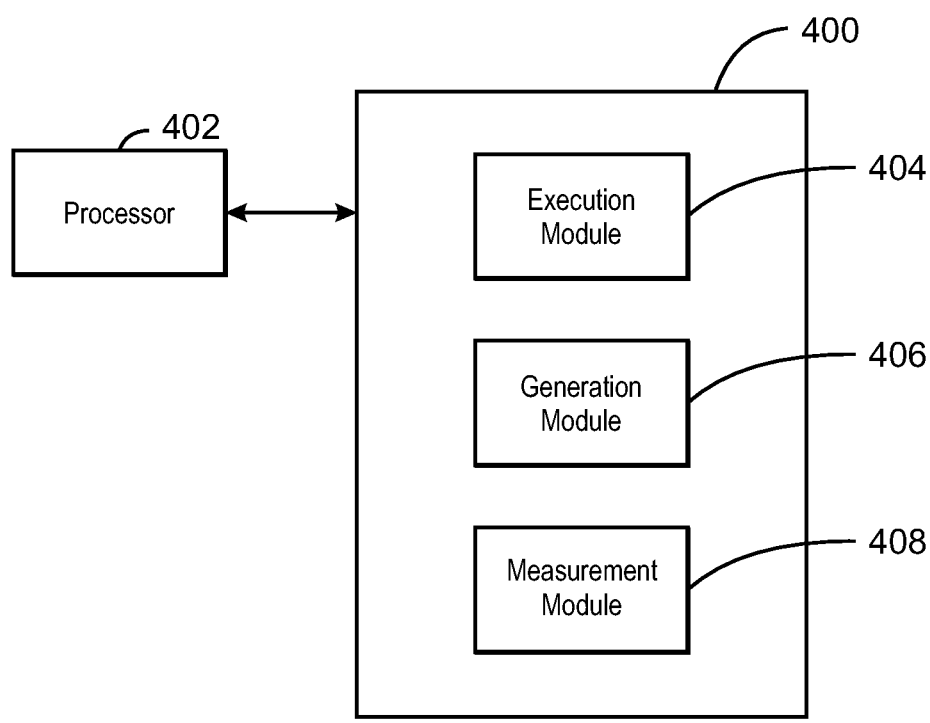
FIG. 4 is a block diagram showing a non-transitory, computer-readable medium that stores code for measuring the effect of interruptions on software application usability according to an embodiment of the present techniques.

FIG. 4 is a block diagram showing a non-transitory, computer-readable medium that stores code for measuring the effect of interruptions on software application usability according to an embodiment of the present techniques. The non-transitory, computer-readable medium is generally referred to by the reference number 400.

The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 402 generally retrieves and executes the computer-implemented instructions stored in the non-transitory, computer-readable medium 400 for measuring the effect of interruptions on software application usability. At block 404, an execution module may request a user to execute a task using a software application under test. At block 406, a generation module may generate an interruption that interrupts the user while the user is attempting to complete the task. At block 408, a measurement module may measure an effect of the interruption on the user to successfully complete the task.

What is claimed is:

1. A system for measuring an effect of interruptions on software application usability, the system comprising:
   a processor that is adapted to execute stored instructions; and a memory device that stores instructions, the memory device comprising processor-executable code, that when executed by the processor, is configured to:
   request a user to execute a first task using a software application under test;
   generate an interruption that interrupts the user while the user is attempting to complete the first task, where the interruption is a second task to be performed by the user; and
   measure an effect of the interruption on the ability of the user to successfully complete the first task, where the effect of the interruption is used to improve usability of the software application.

2. The system recited in claim 1, comprising processor-executable code, that when executed by the processor, is adapted to review a usability test to identify a location within the usability test to generate an interruption.

3. The system recited in claim 1, comprising processor-executable code, that when executed by the processor, is adapted to identify random locations within a usability test to generate the interruption.

4. The system recited in claim 1, comprising processor-executable code, that when executed by the processor, is adapted to generate an interruption that affects the user in a pre-determined manner.

5. The system recited in claim 1, comprising processor-executable code, that when executed by the processor, is adapted to measure the effect of the interruption on usability for a panel of users by alternating a type of interruption generated for each user of the panel of users.

6. The system recited in claim 1, comprising processor-executable code, that when executed by the processor, is adapted to measure the effect of the interruption on usability by measuring a recovery time for the user or determining user error.

7. The system recited in claim 1, comprising a clock that captures a duration of the interruption, a duration of the effect of the interruption, or a duration of the first task performed by the user.

8. A method for measuring an effect of interruptions on software application usability, the method comprising:
   requesting a user to execute a first task using a software application under test;
   generating an interruption that interrupts the user while the user is attempting to complete the first task, where the interruption is a second task to be performed by the user;
   measuring an effect of the interruption on the ability of the user to successfully complete the first task; and
   refining the software application to improve usability of the software application based on the effect of the interruption.

9. The method recited in claim 8, comprising reviewing a usability test to identify a location within the usability test to generate an interruption.

10. The method recited in claim 8, comprising identifying random locations within a usability test to generate the interruption.

11. The method recited in claim 8, comprising generating an interruption that affects the user in a pre-determined manner.

12. The method recited in claim 8, wherein measuring the effect of the interruption on usability for a panel of users includes alternating a type of interruption generated for each user of the panel of users.

13. The method recited in claim 8, wherein measuring the effect of the interruption on usability includes measuring a recovery time for the user or determining user error.

14. The method recited in claim 8, comprising capturing a duration of the interruption, a duration of the effect of the interruption, or a duration of the first task performed by the user.

15. A non-transitory, computer-readable medium, comprising code configured to direct a processor to:
   request a user to execute a first task using a software application under test;
   specify a location within the software application to generate an interruption;
   generate an interruption at the location that interrupts the user while the user is attempting to complete the task, where the interruption is a second task to be performed by the user; and
   measure an effect of the interruption on the ability of the user to successfully complete the first task.

16. The non-transitory, computer-readable medium recited in claim 15, comprising generating an interruption that affects the user in a pre-determined manner.

17. The non-transitory, computer-readable medium recited in claim 15, wherein measuring the effect of the interruption on usability for a panel of users includes alternating a type of interruption generated for each user of the panel of users.

18. The non-transitory, computer-readable medium recited in claim 15, wherein measuring the effect of the interruption on usability includes measuring a recovery time for the user or determining user error.

19. The non-transitory, computer-readable medium recited in claim 15, comprising capturing a duration of the interruption, a duration of the effect of the interruption, or a duration of the first task performed by the user.

* * * * *